United States Patent [19]

Weseloh et al.

[11] 3,988,949

[45] Nov. 2, 1976

[54] SPLIT-TORQUE POWER TRANSMISSION

[75] Inventors: William E. Weseloh, San Diego; Elias Orshansky, Jr., San Francisco, both of Calif.

[73] Assignee: Orshansky Transmission Corporation, New York, N.Y.

[22] Filed: Aug. 12, 1974

[21] Appl. No.: 496,737

Related U.S. Application Data

[63] Continuation-in-part of Ser. No. 478,719, June 12, 1974, abandoned.

[52] U.S. Cl. .................................................. 74/687
[51] Int. Cl.² ........................................... F16H 47/04
[58] Field of Search .......... 74/681, 687, 720, 720.5, 74/329

[56] References Cited
UNITED STATES PATENTS

| | | | |
|---|---|---|---|
| 3,127,792 | 4/1964 | Balbaschewski | 74/687 |
| 3,446,093 | 5/1969 | Orshansky, Jr. | 74/687 |
| 3,503,281 | 3/1970 | Gisching et al. | 74/687 X |
| 3,534,631 | 10/1970 | Keller | 74/687 |
| 3,709,060 | 1/1973 | Orshansky, Jr. | 74/687 |
| 3,709,061 | 1/1973 | Orshansky, Jr. | 74/687 |

FOREIGN PATENTS OR APPLICATIONS

| | | | |
|---|---|---|---|
| 1,530,590 | 10/1969 | Germany | 74/687 |

*Primary Examiner*—Samuel Scott
*Assistant Examiner*—Frank H. McKenzie, Jr.
*Attorney, Agent, or Firm*—Owen, Wickersham & Erickson

[57] ABSTRACT

A relatively inexpensive simplified type of split-torque power transmission. A simple planetary gear assembly is employed having a carrier connected to the input with a set of planet gears, a ring gear, and a sun gear. Suitable speed-varying means are used, such as two variable-stroke hydraulic units, each having rotary shafts and driving relation therewith, the two units being hydraulically connected together so that one serves as a pump while the other serves as a motor, and vice versa. Two gear trains respectively connect the ring gear to the first rotary shaft and the sun gear to the second rotary shaft. A first clutch means connects the first rotary shaft in driving relation to the output means, and a second clutch means connects the second rotary shaft in driving relation to the output shaft. A three-range transmission and a four-range transmission are also shown.

35 Claims, 19 Drawing Figures

3,988,949

SPLIT-TORQUE POWER TRANSMISSION

CROSS REFERENCE TO ANOTHER PATENT APPLICATION

This application is a continuation-in-part of application Ser. No. 478,719 filed June 12, 1974 now abandoned.

BACKGROUND OF THE INVENTION

This invention relates to a split-torque power transmission. Split-torque transmissions have heretofore been complicated and expensive. This is still necessary in many instances, but with the present invention it becomes possible to provide a simple split-torque transmission for use where transmissions are narrow in range or do not require extreme efficiency or where cost is a primary object. Many of the advantages of split-torque transmissions apply to the use of this invention.

Thus, one of the objects of the invention is to provide a split-torque transmission having the inherent advantages of such a structure, yet involving low cost and great simplicity.

SUMMARY OF THE INVENTION

The split-torque power transmission of the present invention uses a simple planetary gear assembly having a carrier connected to the input and carrying one or more sets of planet gears.

In some forms of the invention there is only one set of planet gears, and a ring gear and a sun gear are both meshed with the same planet gears. In some other forms of the invention there are two sets of planet gears, both carried by the same carrier; in these forms a ring gear may be meshed with one set and a sun gear with another set, or the two separate sets may be meshed with separate ring gears or with separate sun gears. In each instance of the present invention the planetary assembly has only three members, in the sense that there are only three members which rotate about the main common axis. There are always a member which is acting as an input, a member which is acting as an output, and a member which is acting as a reaction. The member acting as an input always acts as an input, no matter what member it is—carrier, sun gear, or ring gear; however, the member which acts as the output in one range acts as a reaction in another range, and the member which was acting as the reaction in the former range acts as the output in the latter range. This is always true whether the outputs be a ring gear and a sun gear or a pair of ring gears or a pair of sun gears—or a carrier and one of the gears.

Speed-varying means are provided; for example, two variable-stroke hydraulic units may be used, each having rotary shafts and driving relation therewith. These hydraulic units are hydraulically connected together, so that one serves as a pump while the other serves as a motor and vice versa. For example, in some forms of the invention, two gear trains are used, one connects the ring gear to the rotary shaft of the first hydraulic unit and the other connects the sun gear to the rotary shaft of the second hydraulic unit. Two clutch means are also provided, and one of them can connect the rotary shaft of the first hydraulic unit in driving relation to the output means, while the other connects the rotary shaft of the second hydraulic unit in driving relation to the output means. In place of hydraulic units, friction drives or electric motors or driven belts may be used.

Two basic forms of the invention are shown—one adapted primarily for passenger vehicles and the other primarily for off-the-road vehicles or road maintenance vehicles, such as scrapers, where cost is an important factor and high efficiency is not required.

The transmission particularly adapted to passenger vehicles provides a system that, except for the hydaulic units, is coaxial. That is, the input means, the output means, the planetary assembly, and the set of three auxiliary shafts are all preferably coaxial with each other. For example, in some forms of the invention, the sun gear is mounted on a hollow shaft carrying a spur or helical gear that meshes with a gear secured to the shaft of one of the two hydraulic units; the ring gear is connected to a shaft lying in between the input and output shafts and coaxial with the input shaft, and this shaft carries a gear which is meshed with a gear on the shaft for the other hydraulic unit. Another hollow shaft is provided around this latter shaft, and it carries a gear which is meshed with another gear on the shaft for the hydraulic unit that is in driving relation to the sun gear. Both of these two latter shafts, which are coaxial, are clutchable to the output shaft be separate clutching means. Three- and four-range transmissions can also be provided.

The form of the invention particularly adapted for rough use at low speeds, such as in a scraper, is characterized in part by having a pair of hollow shafts, one around each of the two shafts associated with the hydraulic units. Both of these shafts carry spur or helical gears which are meshed to a gear mounted on the output shaft, and the clutch means clutches a hollow shaft to its associated shaft for the hydraulic unit.

A further characterization of this transmission is that the gear train connecting the sun gear to its hydraulic unit and the gear train connecting the ring gear to its hydraulic unit may both have idler gears.

Other objects and advantages of the invention will appear from the following description of two preferred embodiments thereof.

BRIEF DESCRIPTION OF THE DRAWINGS

In the drawings:

FIG. 1A is a clutch-engagement diagram for the transmission of FIG. 1.

FIG. 3A is a clutch-engagement diagram for the transmission of FIG. 3.

FIG. 4A is a clutch-engagement diagram for the transmission of FIG. 4.

FIG. 6A is a clutch-engagement diagram for the transmission of FIG. 6.

FIG. 8A is a clutch-engagement diagram for the transmission of FIG. 8.

FIG. 12A is a clutch diagram for the transmission of FIG. 12.

DETAILED DESCRIPTION OF THE PREFERRED EMBODIMENTS

Figure 1:
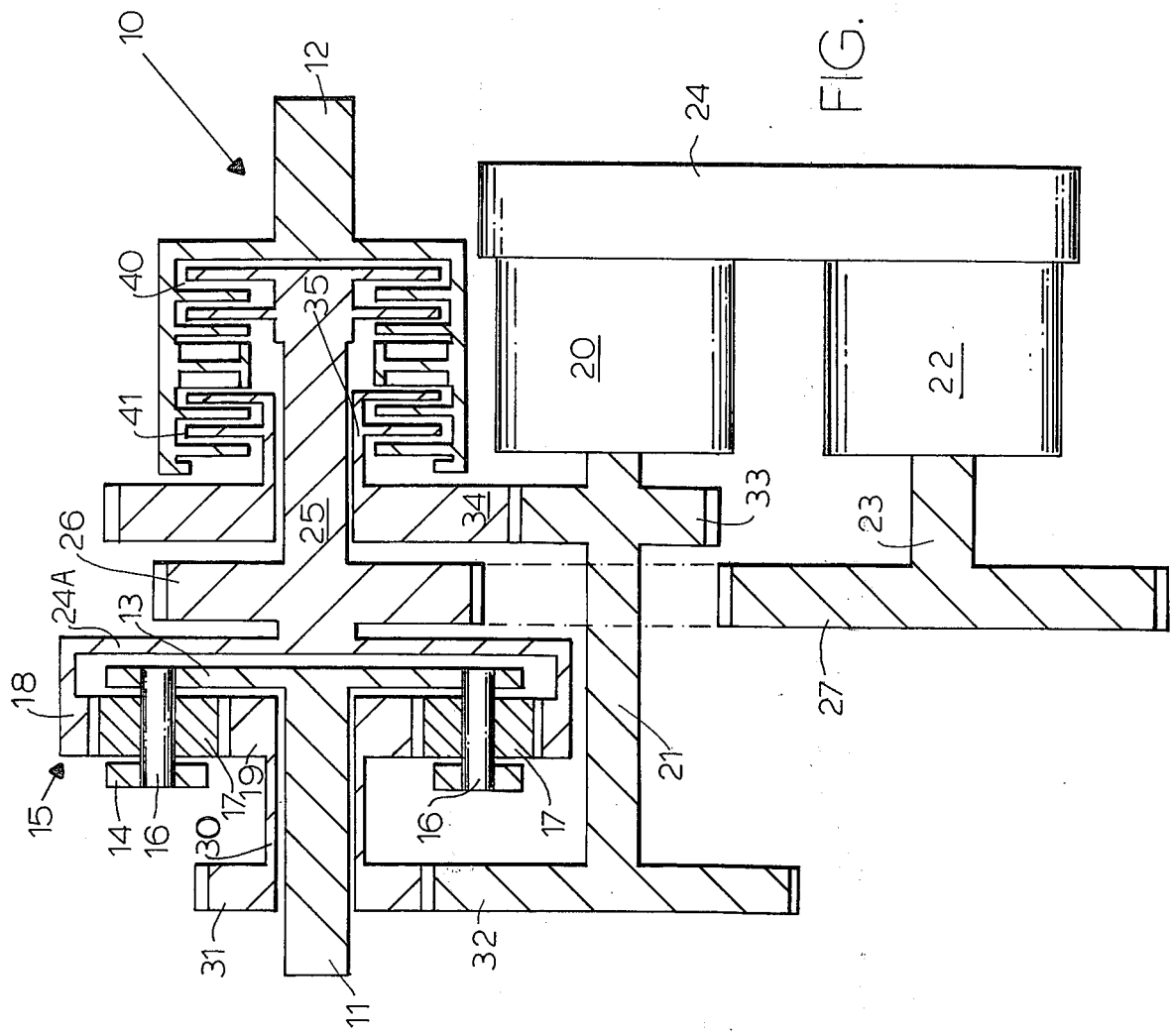
FIG. 1 is a diagrammatic drawing of a simple split-torque transmission embodying the principles of the invention. The view is diagrammatic and a pair of broken lines indicate that the two gears so connected actually are in mesh, for their shafts lie in different planes, though the structure cannot be shown in the drawing in a single plane without obscuring the structure.
Figure 2:
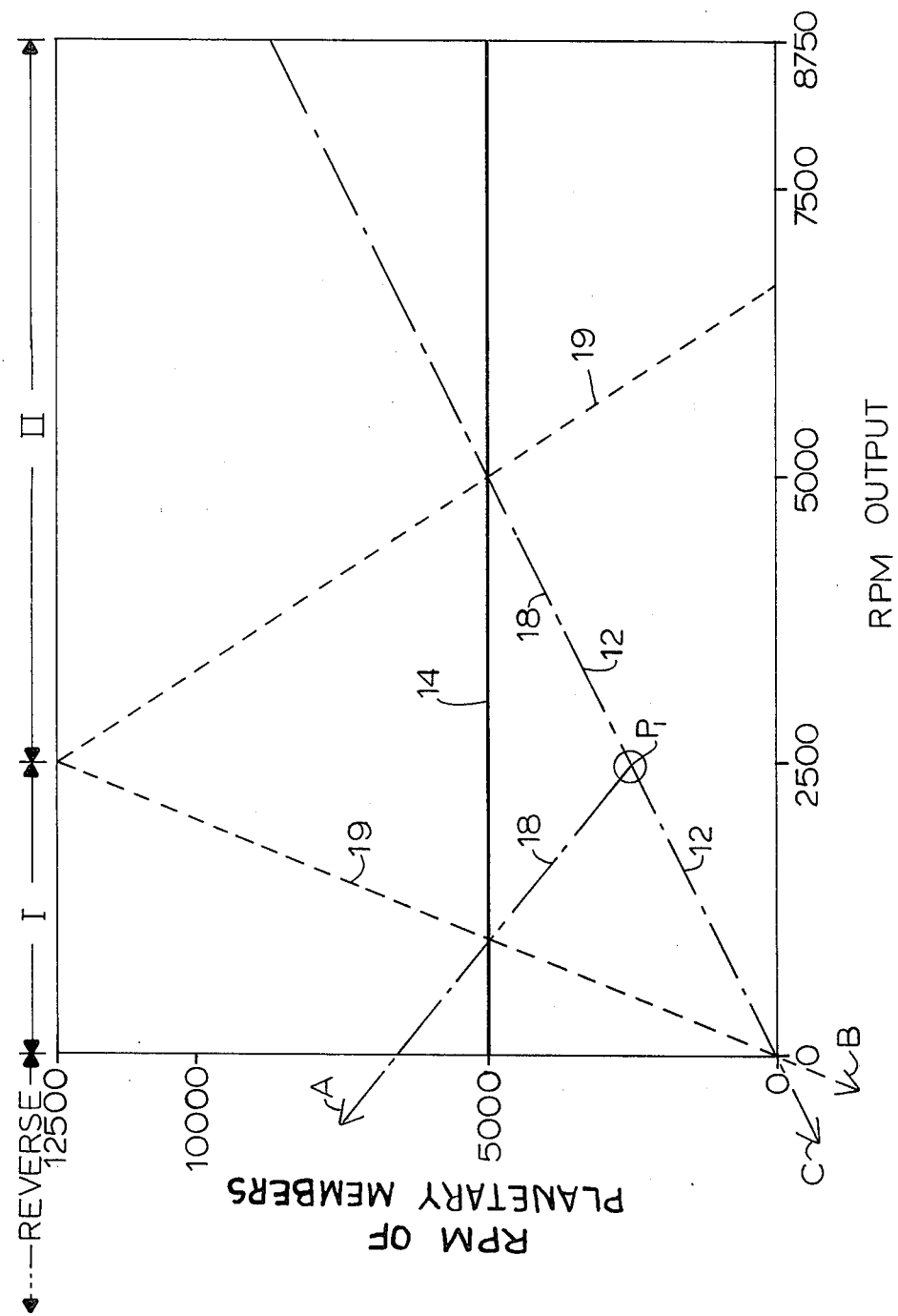
FIG. 2 is a speed lines diagram of the transmission of FIG. 1, with the vertical axis showing the input in rpm and the horizontal axis showing the output in rmp.

A simplified passenger car transmission (FIGS. 1 and 2)

FIG. 1 shows a transmission 10 which is a very simple split-torque power transmission. It includes an input shaft 11 which is coaxial with an output shaft 12. The input shaft 11 is connected by a radially extending member 13 to a carrier 14, which serves as the input member of a planetary assembly 15. The carrier 14 includes a shaft 16 carrying a set of planetary gears 17. The planetary assembly 15 also includes a ring gear 18 and a sun gear 19.

Two hydraulic units are provided, namely: a unit 20 having a rotary shaft 21 in driving relation therewith and a unit 22 having a rotary shaft 23 in driving relation with it. The two units 20 and 22 are connected together by a hydraulic arrangement 24, which includes hydraulic lines so that when the unit 20 operates as a pump the unit 22 operates as a motor and vice versa. Both of the units 20 and 22 are variable in stroke.

The ring gear 18 is secured by a radially extending member 24A to a shaft 25 which is coaxial with both the input shaft 11 and the output shaft 12 and lies in between them. The shaft 25, which may be called a transmission shaft, carries a gear 26. The gear 26 is in mesh with a gear 27 mounted on the shaft 23.

The sun gear 19 is preferably mounted on a hollow shaft 30 which is coaxial with and surrounds the input shaft 11 and carries, secured to it, a gear 31, which may be a spur gear or a helical gear. The gear 31 is in mesh with a gear 32 that is secured to the rotary shaft 21. The shaft 21 also carries another gear 33, and the gear 33 is in mesh with a gear 34 which is mounted on another hollow shaft 35 that preferably surrounds and is coaxial with the transmission shaft 25. In place of direct meshing of the gears 26 and 27, 31 and 32, or 33 and 34, etc., an idler gear may be interposed, depending on convenience in spacing and ratios. Also, the hydraulic unit 20, for example, may be driven directly by the shaft 21, as shown, or through a gear train, not shown.

A first clutch 40 clutches the shaft 25 to the output shaft 12, while a second clutch 41 clutches the second transmission shaft 35 to the output shaft 12. In practice, these clutches 40 and 41 are engaged in a synchronous manner so that the transfer can be made by first engaging the non-engaged clutch and then releasing the previously engaged clutch.

In this device the ring gear 18 serves as an output gear when the clutch 40 is engaged, and at that time the sun gear 19 serves as a reaction gear. Similarly, when the sun gear 19 is used as an output gear, that is, when the clutch 41 is engaged, the ring gear 18 serves as a reaction gear. FIG. 1A indicates the clutching pattern.

FIG. 2 will help to make clear the function and operation of the transmission 10 of FIG. 1. Note that this speed lines diagram has the lines numbered to correspond to the elements shown in FIG. 1, so that the relative speed of the ring gear 18, the sun gear 19, the carrier 14 and the output shaft 12 are all shown in this diagram. Two forward ranges are shown, and the reverse range is partially shown. An arrow A at the left-hand side indicates that the ring gear 18 can, in effect, go over center and into reverse and can thereby cause the sun gear 19 and the output shaft 12 also to go in reverse, as indicated by the arrows B and C at the lower left-hand corner.

In reverse there is no overspeed. Consequently, the engine can maintain continual speed both forward and reverse up to a reasonable speed ratio in reverse, because the maximum speed in reverse can equal the maximum speed in Range I, if that is desired.

Considering the forward speeds, Range I extends from the zero output speed to 2500 rpm in this particular example. Of course, other speeds could be selected. In Range I the drive is from the input shaft 11 through the carrier 14 and the planet gears 17 to the sun gear 19 and thence by the gears 31 and 32 to the shaft 21, which is in driving relation with the hydraulic unit 20. From the shaft 21, the gear 33 carries the output power to the gear 34 and its shaft 35, which is connected to the output shaft 12 at this time by the clutch 41. This same arrangement takes place also in reverse.

At the end of Range I, where the output speed is shown by way of example as 2500 rpm, it will be noted that the speed of the gear 18 equals the speed of the output shaft 12 at point P-1. Therefore, the clutch 40 can be synchronously engaged at that time, and then, later, the clutch 41 can be disengaged while they are still acting synchronously. This begins Range II.

In Range II the drive is from the input shaft 11 through the carrier 14 and planet gears 17 to the ring gear 18, and thence via the shaft 25 and the clutch 40 to the output shaft 12. Of course, the gear 26 on the shaft 25 is always meshed with the gear 27 on the rotary shaft 23 of the hydraulic unit 22. The sun gear 19 now acts as a reaction gear.

This Range II then extends for the remainder of the operation of this device.

Figure 3:
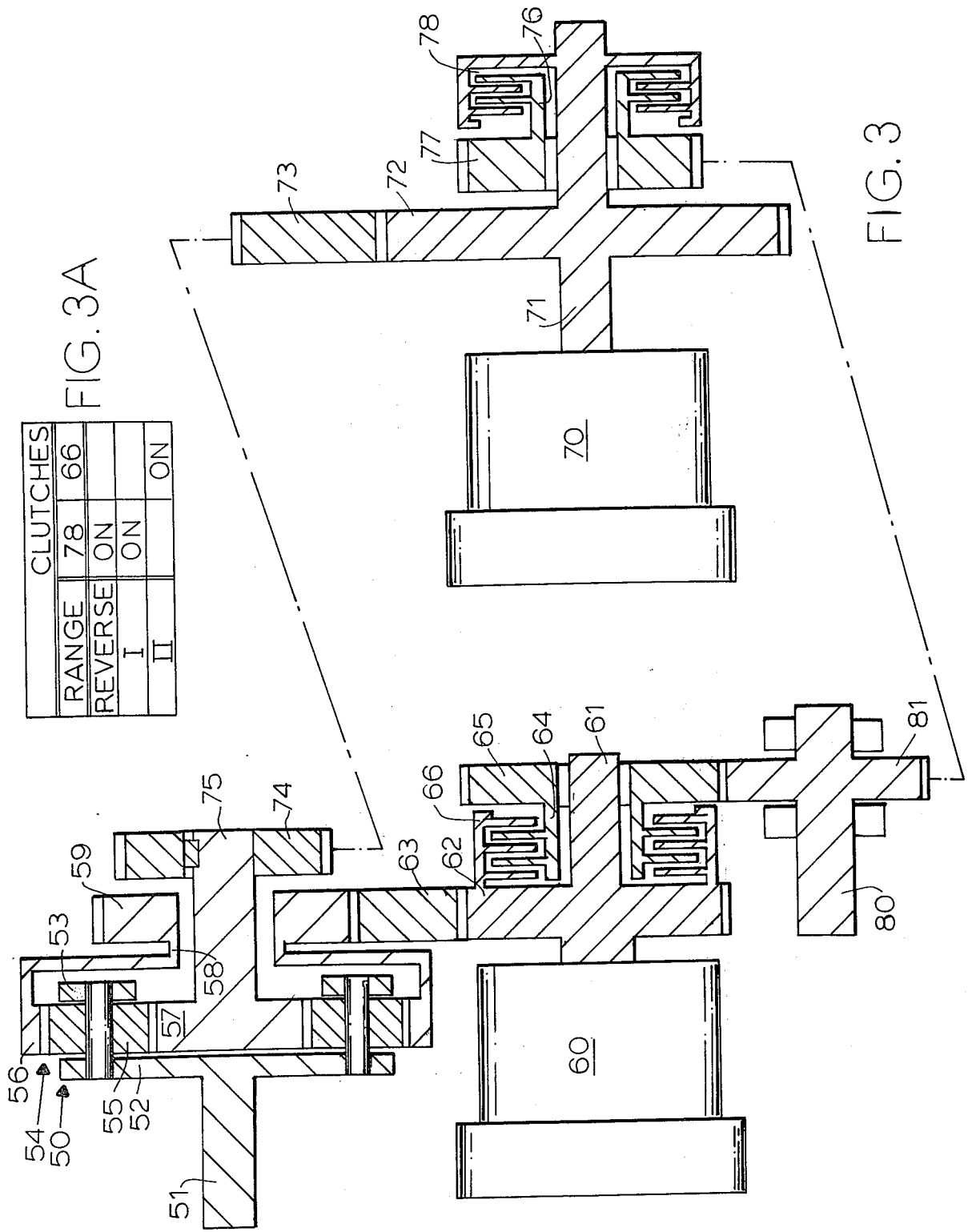
FIG. 3 is a diagrammatic view (again using broken lines to indicate meshing gears while avoiding complications) of a modified form of transmission embodying the principles of the invention and applicable to such units as scrapers, where low speeds are involved and where high efficiency is not required but where cost is a significant factor.

A simplified transmission for off-the-highway and similar use (FIG. 3)

A modified form of transmission is shown in FIG. 3; here the structure is not coaxial. This structure is particularly good where low speeds are to be used or where non-coaxial shafts are better suited to particular vehicles, as in scrapers, and where the conditions are quite different from those in FIG. 1. This form of the invention employs countershafts which are parallel to the input and output shafts, and the input and output shafts are themselves parallel to each other but are not coaxial.

In construction machinery such as scrapers and graders, it is important to have an engine shaft that is not coaxial with the final drive shaft but which lies usually above it. Consequently, it is very often necessary to use a drop box, meaning the gear box, which takes the drive from one center and delivers it to a center that is in parallel with the first center. A second requirement for such transmissions is that they must be extremely short, for the output shaft cannot be a long shaft, since there is very little distance between the gears involved. The present transmission 50 accomplishes both of these purposes in a single assembly.

This transmission 50 has, then, an input shaft 51 which is connected by a radially extending member 52 to a carrier 53 of a planetary assembly 54. The carrier 53 has a set of planetary gears 55 which are meshed with a ring gear 56 and a sun gear 57. The ring gear 56 is rigidly connected to a short hollow shaft 58 having on it a spur (or helical) gear 59. A hydraulic unit 60 has a rotary shaft 61 which carries a gear 62. An idler gear 63 is meshed with both the gear 59 and the gear 62 and transmits the drive between them. A hollow shaft 64 is mounted coaxially around the shaft 61 and carries a gear 65. It is clutchable to the shaft 61 by a clutch 66.

The other hydraulic unit 70 has associated with it a shaft 71, on which is mounted a gear 72. This gear 72 is connected through an idler gear 73 to a gear 74 which is mounted on a shaft 75 that is secured to the sun gear 57. Also, the shaft 71 is surrounded by a hollow shaft 76 having a gear 77 thereon and clutchable to the shaft 71 by a clutch 78. An output shaft 80 is offset from the input shaft 51 and as well as from the shafts 61 and 71, and it carries on it an output gear 81 which is meshed both with the gear 65 of the hollow shaft 64 and with the gear 77 of the hollow shaft 76.

In the first range of this device the drive from the input shaft 51 and carrier 53 is transmitted by the planet gears 55 to the sun gear 57 and thereby to the shaft 75 and the gear 74. The gear 74 then drives the gear 72 of shaft 71 by acting through the idler gear 73. This range is used in reverse and in first gear. The clutch 78 is engaged, and the drive is therefore from the shaft 71 through the gear 77 to the gear 81 and therefore to the output shaft 80. At this time the ring gear 56 is acting as a reaction member.

The speed lines diagram would be very similar, except for the actual speed relations to that shown in FIG. 2, and the hydraulic units 60 and 70 are used to increase the output speed and thus the speed of the gear 65, until the gear 65 is running at the speed of the shaft 61, and then a synchronous shift can be made by engaging the clutch 66 and thereupon releasing or disengaging the clutch 78. The drive, then, during Range II is from the input shaft 51, via the carrier 53, the planet gears 55 and the ring gear 56 through the gear 59, and the idler gear 63 to the gear 62 on the shaft 61. Since the clutch 66 is engaged, the gear 65 then transmits the power from the shaft 61 to the gear 81. In the meantime, the sun gear 57 is acting as the reaction gear.

Figure 4:
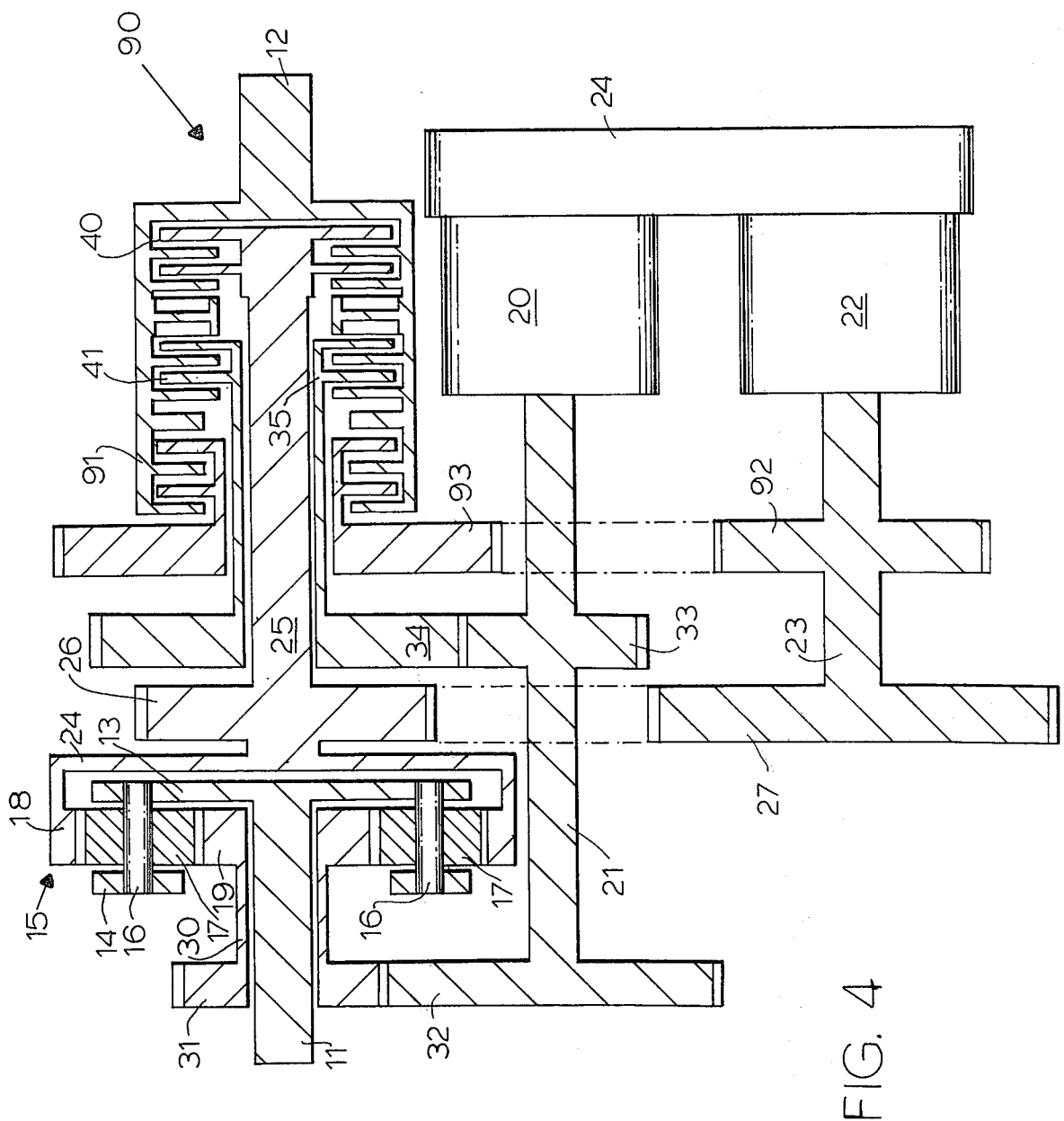
FIG. 4 is a view like FIG. 1 of a transmission generally like that of FIG. 1 adapted for three forward speed ranges.
Figure 5:
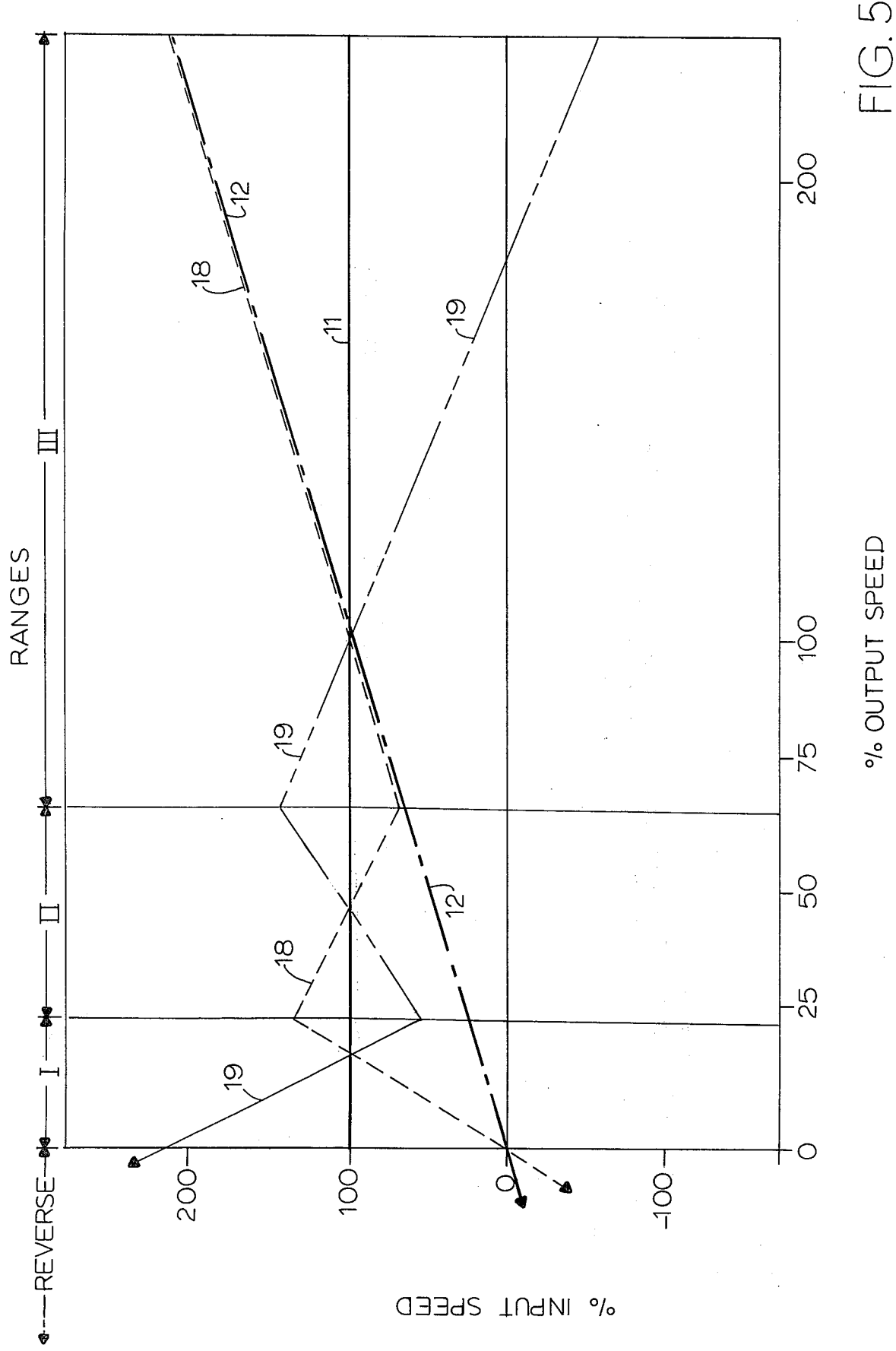
FIG. 5 is a speed lines diagram of the type of FIG. 2 for the transmission of FIG. 4.

A three-range simplified transmission (FIGS. 4 and 5)

FIGS. 4 and 5 illustrate a modification of the transmission shown in FIGS. 1 and 2. The same reference numerals are employed where the parts are identical, or substantialy so, but a novel transmission 90 is shown in which there are three forward ranges.

The transmission 90 contains an additional clutch 91 which transmits to the output shaft 12 power coming from a gear 92, secured to the shaft 23, via a gear 93 which is mounted coaxially with the shaft 25 but is not secured to it.

Ranges II and III of the clutch 90 correspond basically with Ranges I and II of the transmission 10 of FIG. 1, but in the lowest range (and in reverse, at least the lowest range thereof) the clutch 91 is employed. This is shown in FIG. 4A, which is a clutch engagement diagram for the transmission of FIG. 4.

Thus, from starting and at the lowest speeds, the sun gear 19, which also drives the third range (as described for the second range in the transmission 10) is used to drive the hollow shaft 30 and the gear 31 mounted thereon, which is engaged with the gear 32 mounted on the shaft 21 for the hydraulic unit 20. Then the hydraulic unit 20 drives the hydraulic unit 22. The shaft 23 incorporates the gear 92. Again, the gear 92 is in mesh with the gear 93, which is engageable by the clutch 91 to the output shaft 12. In addition to this hydrostatic drive of the gear 92, there is ia mechanical drive of the gear 92 from the ring gear 18 through the gears 26 and 27 to the shaft 23. Thus, the gear 93 is driven hydromechanically.

The speed lines diagram shown in FIG. 5 illustrates what happens. Again, the lines are numbered to correspond to the gear elements involved, and it will be noticed that the addition to what was presented in FIG. 1 lies in Range I. The hydromechanical start is also used for reverse, as a hydromechanical reverse going in the direction to the left of the zero percent of output speed line.

Figure 6:
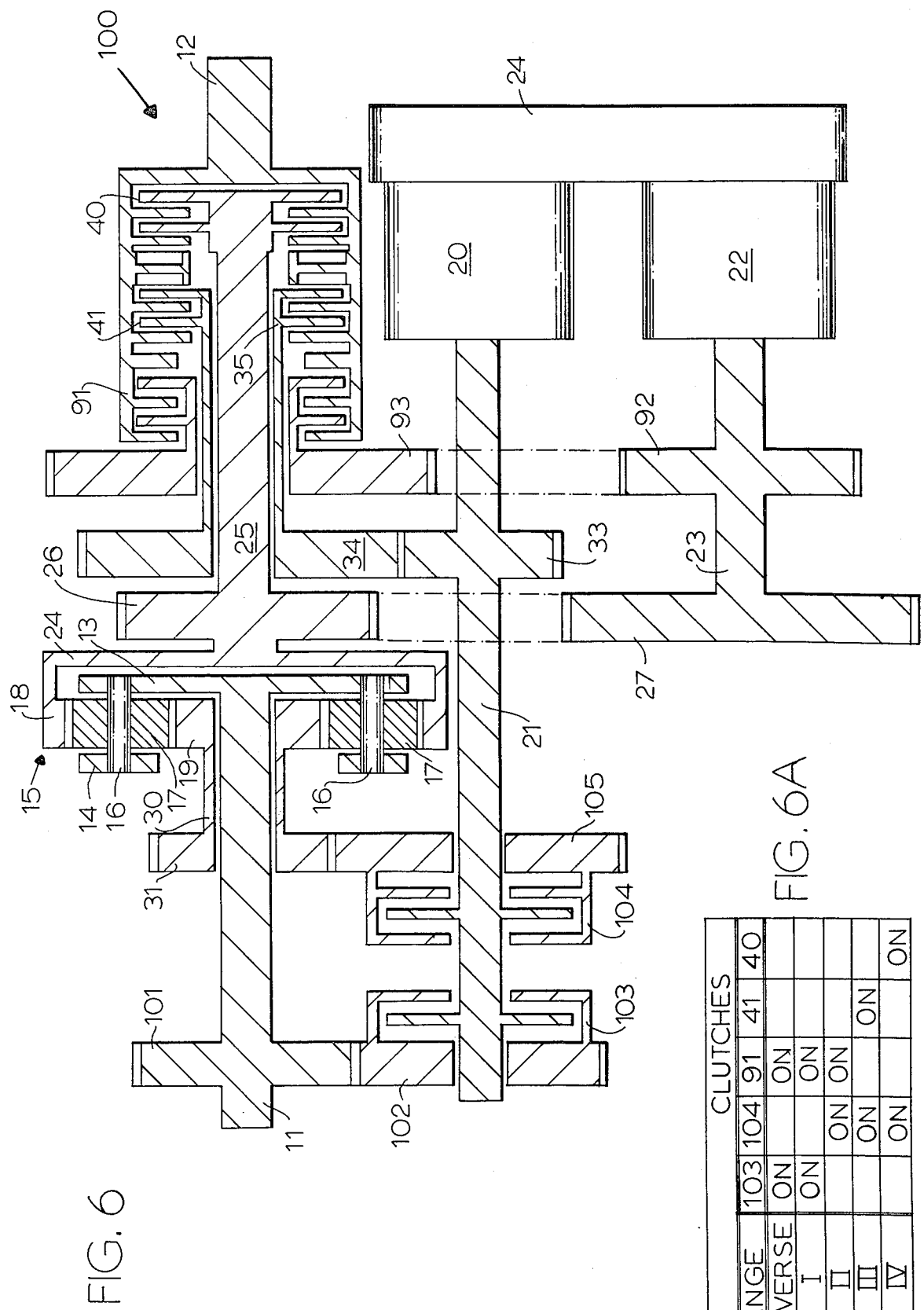
FIG. 6 is a view like FIG. 4 of a similar transmission adapted for four forward speeds.
Figure 7:
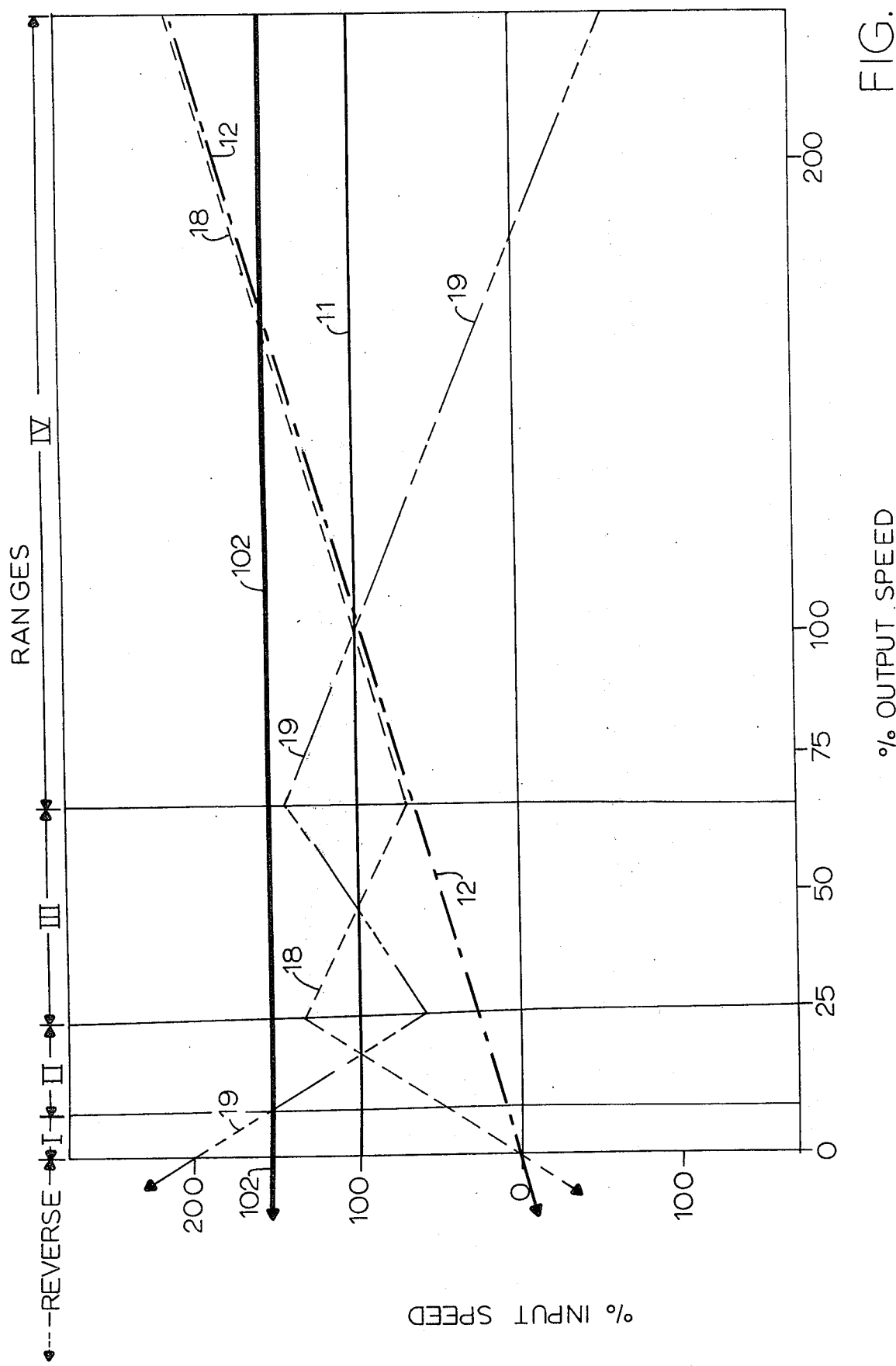
FIG. 7 is a speed lines diagram of the type of FIG. 2 for the transmission of FIG. 6.

A four-range transmission with hydrostatic start and reverse (FIGS. 6 and 7)

The transmission 100 shown in FIG. 6 comprises every element of the transmission 90 shown in FIG. 4 but has some additional elements. The input shaft 11 has secured to it a gear 101 which at all times is in mesh with a gear 102. The gear 102 is clutchable to the shaft 21 by a clutch 103.

A clutch 104 enables the clutching to the shaft 21 of a gear 105, which in this form of the invention replaces the gear 32. The gear 105 is at all times in mesh with the gear 31.

Ranges II, III, and IV of the transmission 100 are identical in operation to the Ranges I, II, and III, respectively, of the transmission 90. The hydrostatic Range I is used for starting and for reverse. In these two ranges the clutch 103 is engaged and the clutch 104 is disengaged. In all other ranges, the clutch 104 is engaged and the clutch 103 is disengaged. Once again, all engagements and disengagements are synchronous, as in all forms of the invention.

Thus, in Range I the input shaft 11 through the gears 102 and 103 drives the shaft 21, which drives the hydraulic unit 20, directly or indirectly, and therefore there is an hydraulic drive from the unit 20 to the unit 22 and, from that, the gear 92 on the shaft 23 drives the gear 93; the clutch 91 is engaged for this Range I. There is no mechanical drive at all in this range; so the drive is purely hydrostatic in this lowest Range I. The results can be seen in the lines diagram, FIG. 7, where the constant speed of the gear 102 is shown, and the drive in Range I is through the gear 102. When the sun gear 19 and the gear 102 are at the same speed, then the clutch 104 is engaged, and immediately thereafter the clutch 103 is disengaged. The clutch 91 still remains engaged for this range II, in which the drive is hydromechanical, as explained before, including the hydraulic drive between the units 20 and 22 and also the mechanical drive via the gears 26 and 27.

At the high speed of Range II, the synchronous shift is made from the clutch 91 to the clutch 41 in the same manner as for the device of FIG. 4.

Although the speed lines diagram FIG. 7 shows a particular speed for the gear 102, this can, of course, be varied and then the intersection point of lines 102 and 19 will change. For example, the gear 102 may operate at the same speed as the input shaft 11, or even be somewhat lower. However, preferably, it is somewhat above it, and this is of course obtained by means of gear ratios. The gear ratio thus determines how early the change will be made from hydrostatic to hydromechanical operation, and this point can be chosen by the design engineer for the transmission to meet any particular conditions which he desires.

Figure 8:
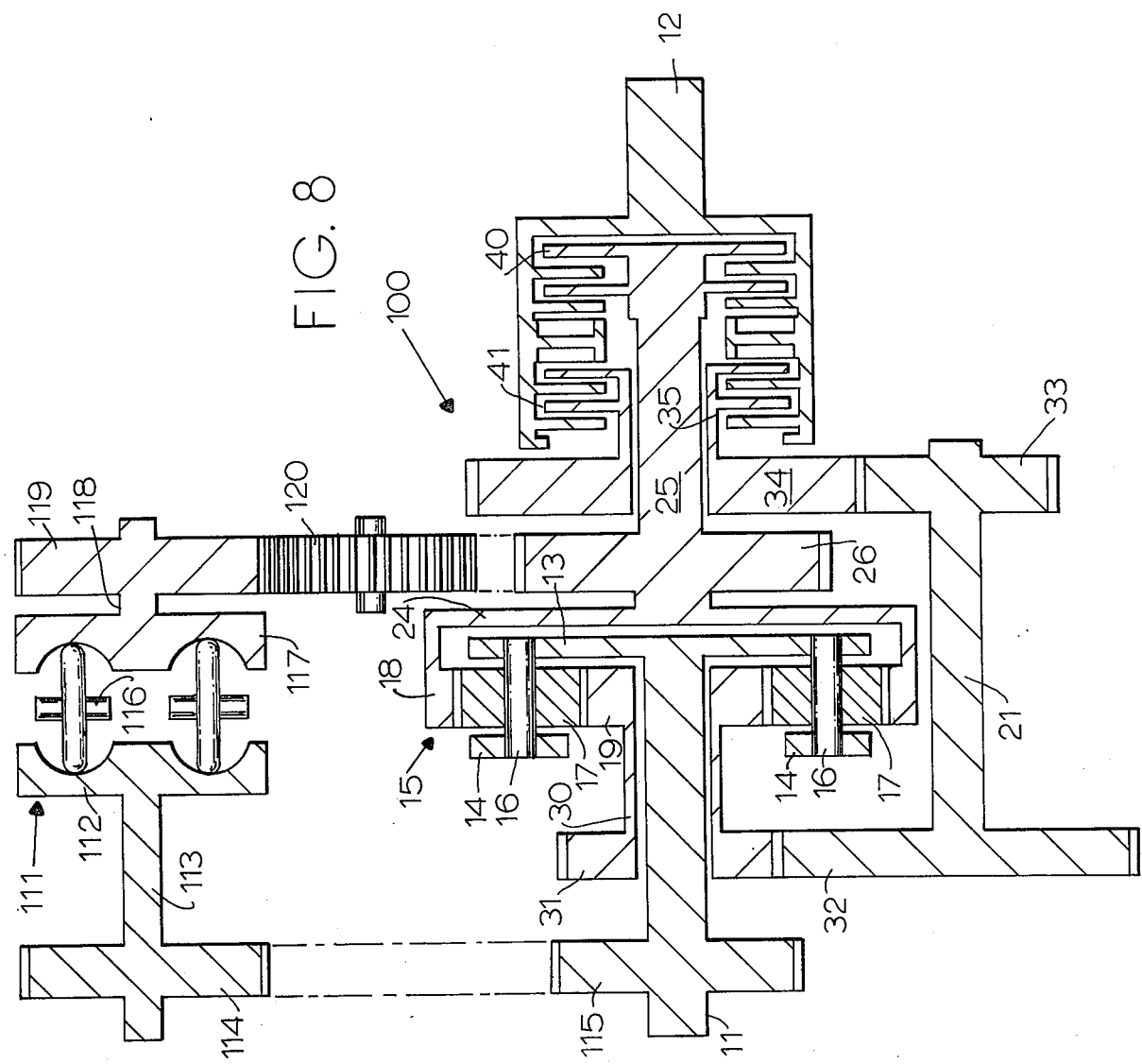
FIG. 8 is a view like FIG. 1 of a modified form of a two-stage transmission incorporating a friction drive instead of the hydraulic units.

A two-range transmission 110 having a friction drive instead of hydraulic units (FIGS. 8 and 8A)

FIG. 8 shows a transmission 110 which is, in most respects, identical to the transmission 10, and identical numbers are used for such elements as are identical. The clutch engagement pattern of FIG. 8A is identical to that of FIG. 1A.

However, the transmission 110 employs a friction-drive assembly 111 in place of the hydraulic units 20 and 22 of the transmission 10.

In the form shown, the transmission 100 has one face element 112 mounted on the shaft 113 which also carries a gear 114. The input shaft 11 carries a gear 115 that is in mesh with the gear 114. Hence, the input shaft 114 always drives the shaft 113 through the gear train 114 and 115. A movable friction connection 116 engages not only the face element 112 but also a face element 117 which is secured by a shaft 118 to a gear 119. The gear 119 is meshed with an idler gear 120 which is also meshed with the gear 26 on the shaft 25. As a result of the idler gear 120, the shafts 113 and 118 are always rotating in opposite directions. The sun gear 19 is connected by gear train means to one side of the friction drive 111, and the ring gear 18 is connected by gear train means to the other side of the friction drive 111.

In the lowest range and at starting, the input shaft 11 transmits its power via the carrier 16 and planet gears 17 through the ring gear 18 to the shaft 25 and then via the clutch 40 to the output shaft 12. Speed in this range is increased by varying the tilt of the element 116 which drives the shaft 25 from the input shaft 11 via the gears 115 and 114, the shaft 113, the friction drive 111, the gears 119, 120, and 26. Meanwhile, the input shaft 11 is also driving the sun gear 19 through the carrier 16 and planet gears 17. The sun gear 19 is driving the hollow shaft 30 and the gear 31, which drives the gear 32, the shaft 21, and the gears 33 and 34. When the shaft 25 reaches the rotational speed of the shaft 35 to which the gear 34 is secured, the synchronous shift can be made, by engaging the clutch 41 and, shortly afterwards, releasing the clutch 40. The friction drive 111 is then used to increase the speed of the shaft 35 by drive from the shaft 25 back to the shaft 11.

In place of the idler gear 120, the gears 119 and 26 may be directly meshed together, and an idler gear (not shown) may be inserted between the gears 114 and 115. The effect is the same.

The speed lines diagram of FIG. 2 applies exactly to FIG. 8, as well as to FIG. 1.

Figure 9:
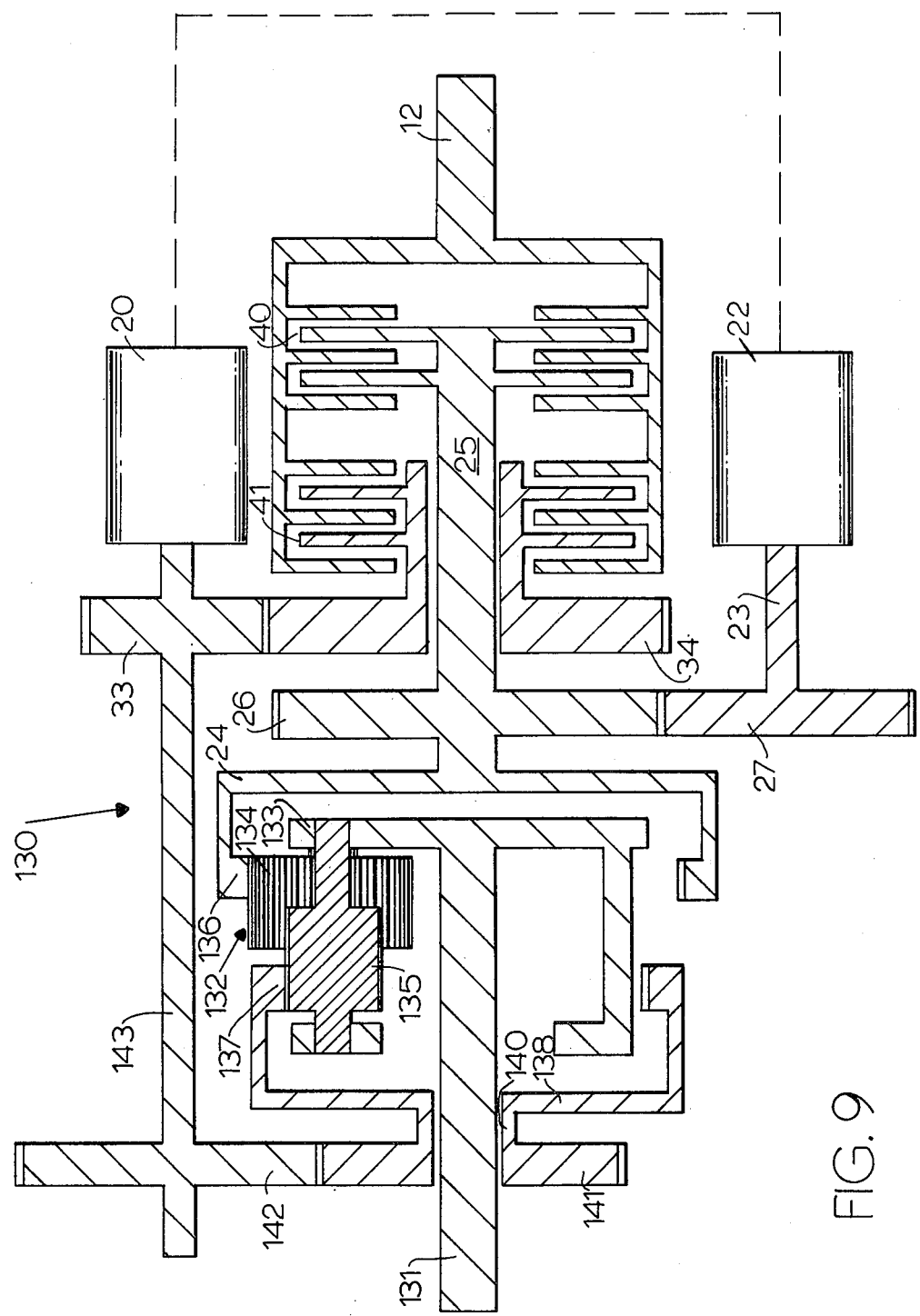
FIG. 9 is a diagrammatic drawing similar to FIG. 1 of a modified form of the invention in which the planet carrier carries two sets of planet gears, one of which is engaged by a first ring gear and the other of which is engaged by a second ring gear, there being no sun gear in this form of the invention.
Figure 10:
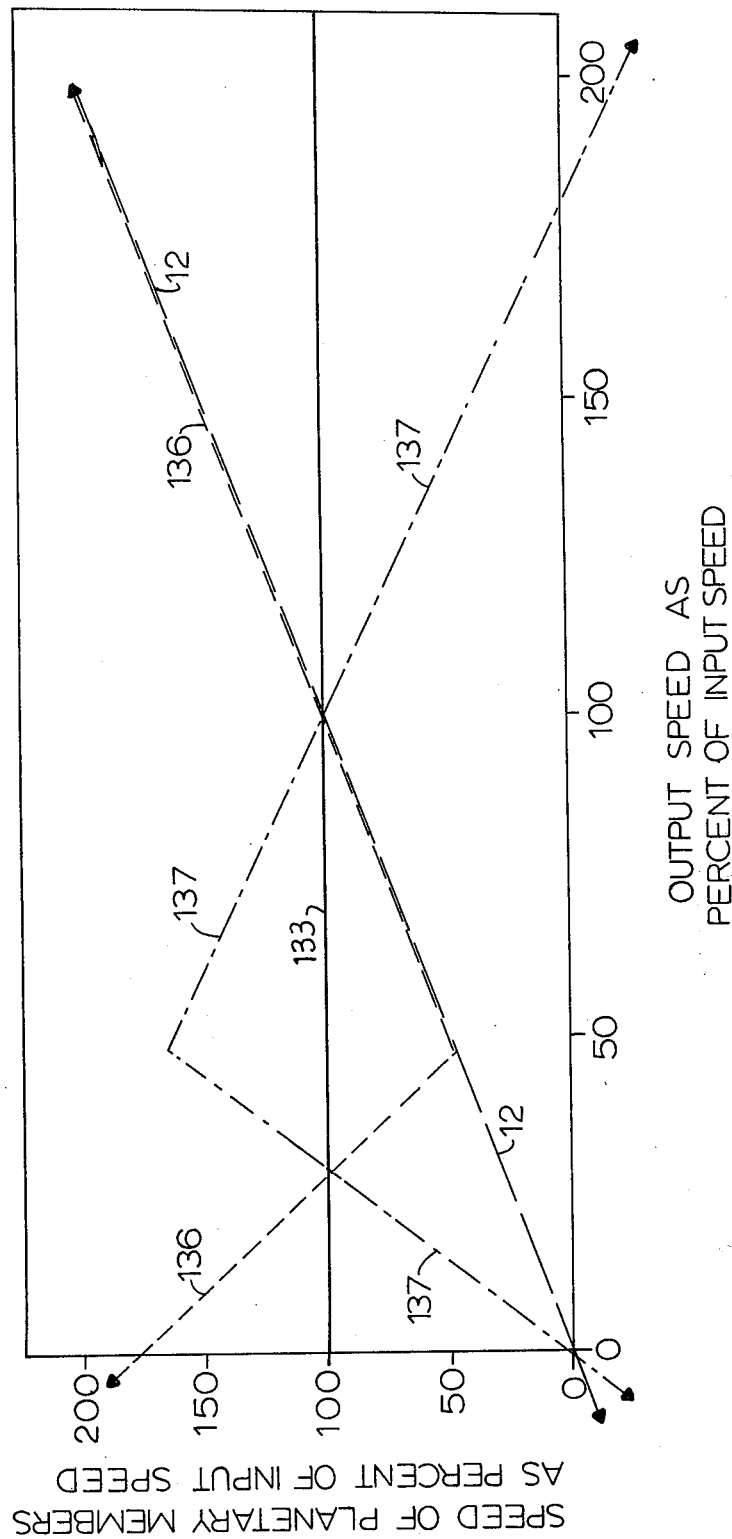
FIG. 10 is a speed lines diagram of the transmission of FIG. 9 with the vertical axis showing the speed of the planetary members as percent of input speed and with the horizontal axis showing the output speed as percent of input speed.

A two-range transmission 130 employing two sets of planet gears meshed with separate ring gears (FIGS. 9 and 10)

A transmission 130 is shown in FIG. 9 to illustrate a modified form of this invention. Here an input shaft 131 drives a planetary assembly 132 through a carrier 133, which acts as the input member to the planetary assembly 132. The planet carrier 133 in this instance carries two sets of planet gears 134 and 135, there preferably being three planet gears in each set. The planet gears 134 are all meshed with a ring gear 136, which is connected by the member 24 to the shaft 25 (identical numbers are used where the elements are substantially identical to those shown in FIG. 1). The structure there and for the clutches all remaining the same as heretofore shown. However, the second set of planet gears 135 is connected to another ring gear 137, and there is no sun gear in this planetary assembly 132. This second ring gear 137 is connected by a suitable member 138 to a hollow shaft 140 on which is secured a gear 141. The gear 141 is meshed to a gear 142 on a shaft 143, which is in driving connection with the hydraulic unit 20 and also carries the gear 33.

It will be apparent from what has already been said that the hydraulic units 20 and 22 operate just as before and that the clutches 40 and 41 also act as they did in FIG. 1. The only difference really is the use of the different form of planetary assembly 132 having no sun gear but having a pair of ring gears 136 and 137 which engage different planet gears 134 and 135, respectively, both supported by the same carrier 133.

Thus, in the transmission 130, one ring gear 136 acts as the output member, while the ring gear 137 is acting as the reaction member of the planetary assembly 132; then when a shift is made synchronously, the ring gear 137 acts as an output member, and the ring gear 136 then acts as a reaction member.

FIG. 10 shows the speed lines diagram for the transmission 130 of FIG. 9, with numbers applied to the parts. The ranges are also shown, and it should also be noted that the same speed lines will apply to the transmission of FIGS. 11 through 13, which are described below.

Figure 11:
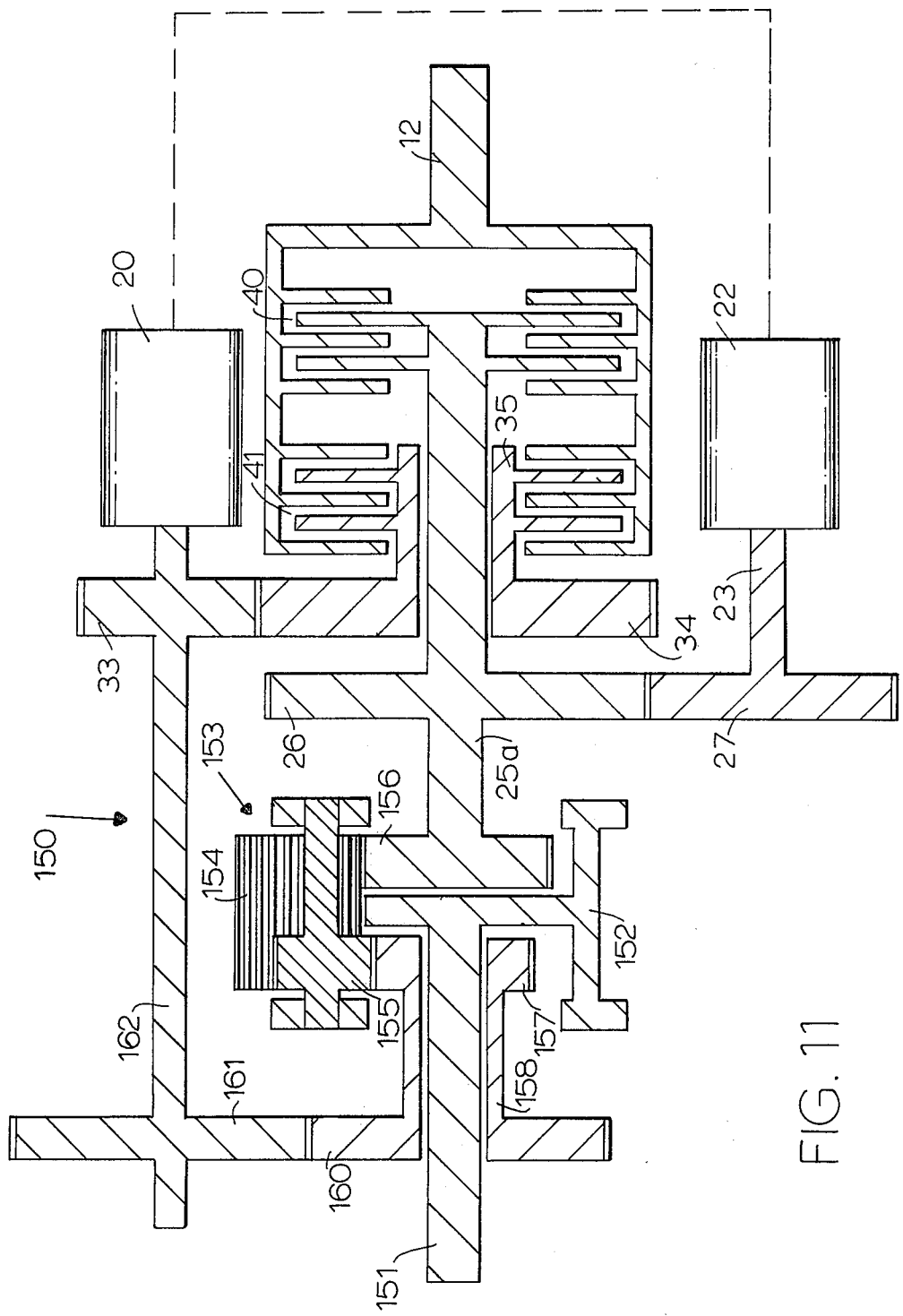
FIG. 11 is a diagrammatic view of another modified form of transmission of this invention in which there are two sets of planet gears carried by the planet carrier, each set being in mesh with a different sun gear, there being no ring gear in this form of the invention.

A two-range transmission 150 having two sets of planet gears both driving sun gears (FIG. 11)

FIG. 11 shows a system which is much like that of FIG. 9 except that, in this instance, the output-reaction gears are both sun gears, and there is no ring gear.

Thus, an input shaft 151 drives a carrier 152 for a planetary assembly 153. The carrier 152 supports two sets of planet gears 154 and 155, preferably having three per set. The planet gears 154 are in mesh with a first sun gear 156, which is secured directly to the shaft 25a which is substantially identical in most particulars to the shaft 25 of FIG. 1. The second sun gear 157 is meshed with the second set of planet gears 155 and is secured to the hollow shaft 158 carrying a gear 160. The gear 160 is meshed with a gear 161, which is secured to a shaft 162 that carries the gear 33 and is also in driving relation with the hydraulic unit 20.

The planet carrier 152 always acts as the input member of the planetary assembly 153. In one range, the sun gear 156 acts as the output member, being directly connected to the shaft 25a, while in the other range the sun gear 157 acts as the output member, and the sun gear 156 then serves as a reaction member. The sun gear 157 serves as a reaction member when the gear 156 is acting as the output member. The operation of this device is, except for the replacement of twin ring gears by twin sun gears, exactly the same as that for FIG. 9, and the lines diagram of FIG. 10 applies.

Figure 12:
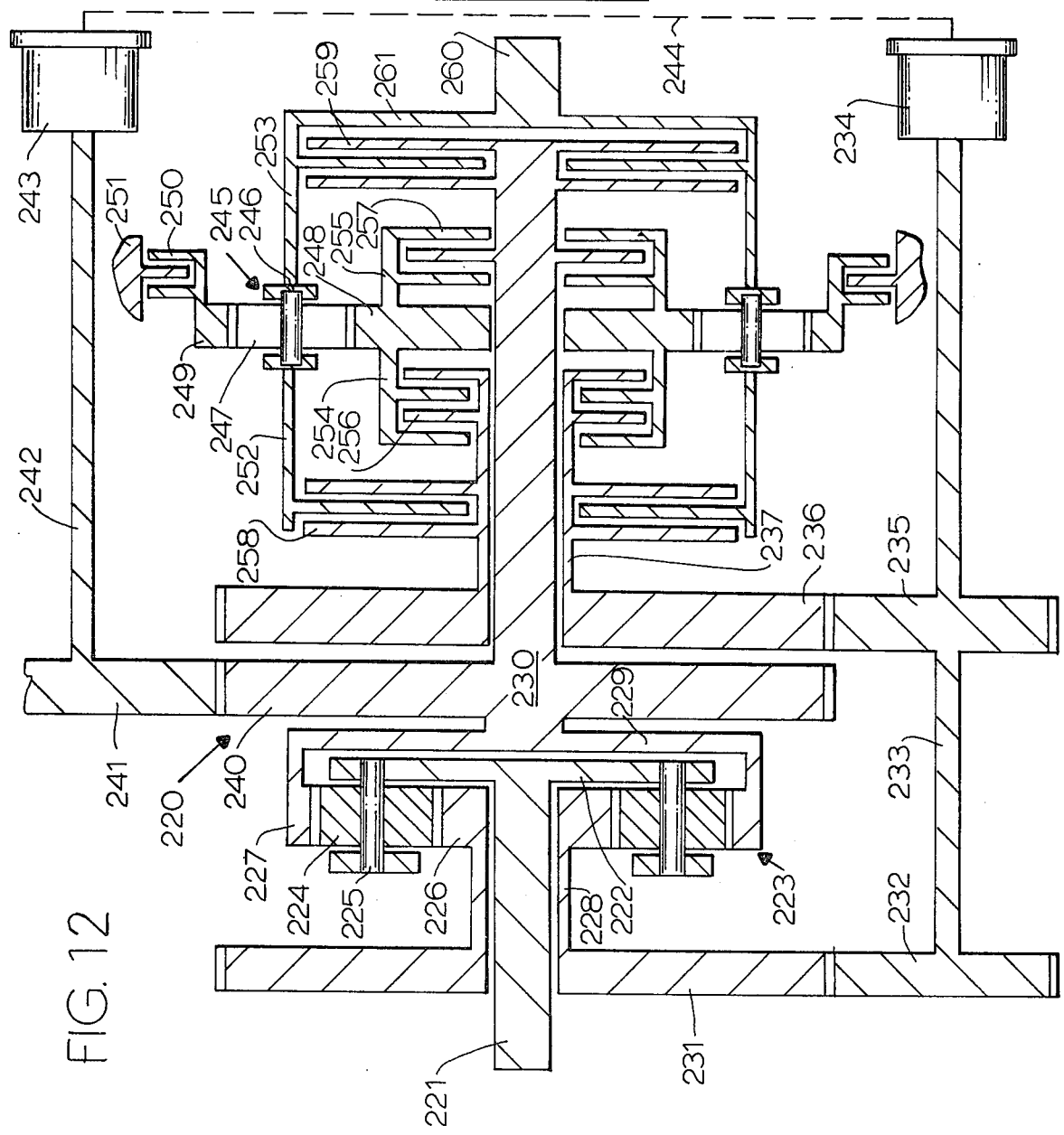
FIG. 12 is a diagrammatic view of another modified form of the invention, a four-range transmission.
Figure 13:
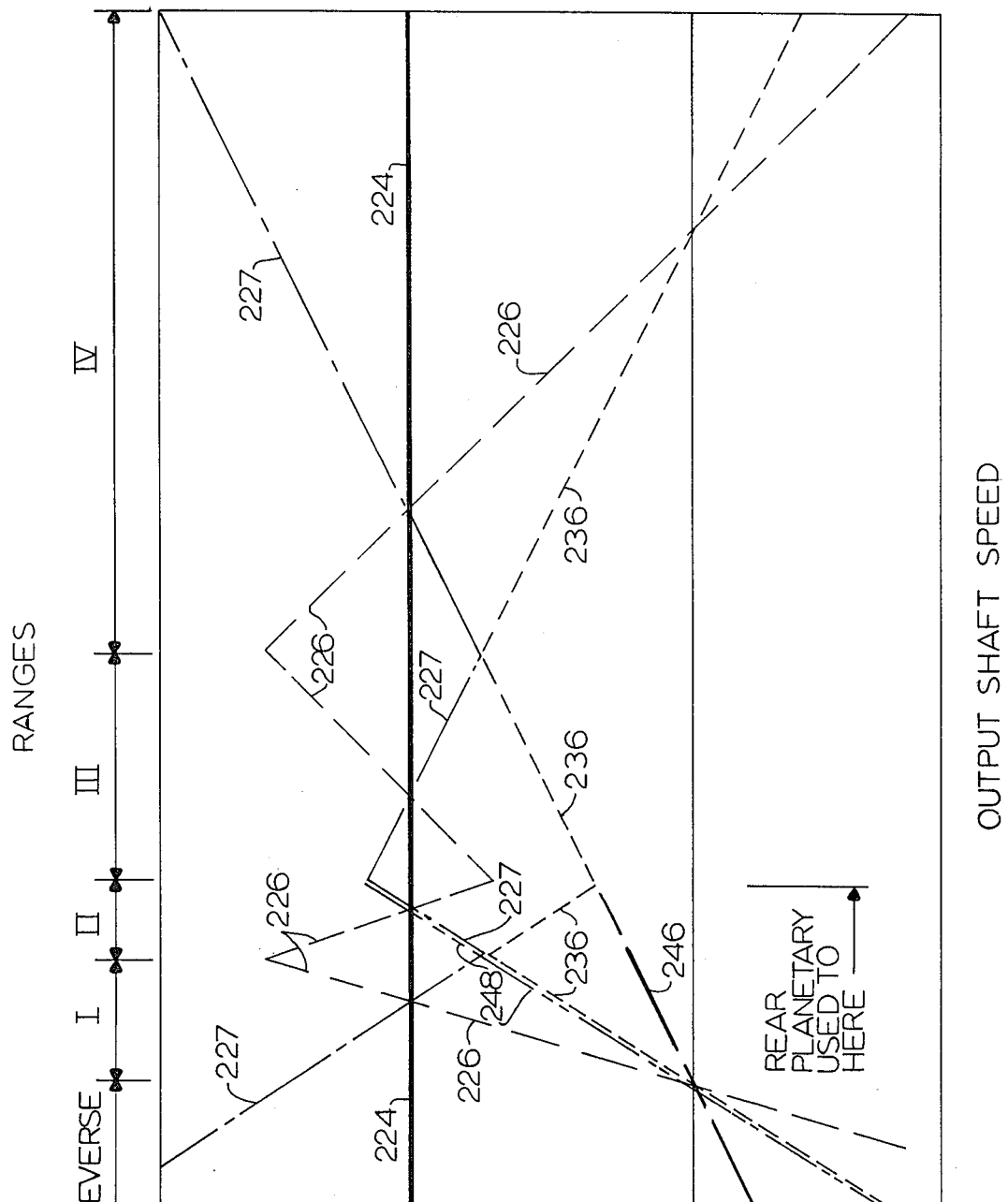
FIG. 13 is a speed lines diagram for the transmission of FIG. 12.

A four-range transmission 220 (FIGS. 12 and 13)

The transmission of this invention may, of course, be equipped with reduction gearing or other systems to enable the incorporation of more than two ranges. A three-range transmission has already been described, and now a four-range transmission 220 will be described.

An input shaft 221 is connected to a carrier 222 of a planetary assembly 223. The carrier 222 carries a set of planet gears 224, each mounted on its separate axle 225. The planet gears 224 are in mesh with a sun gear 226 and also with a ring gear 227. The sun gear 226 is mounted on a hollow shaft 228, while the ring gear 227 is secured by means of a radially extending member 229 to an intermediate shaft 230.

The hollow shaft 228 also carries a gear 231, which is rigidly attached to the shaft 228, and this gear 231 is in mesh with a gear 232 mounted on an auxiliary shaft 233. The shaft 233 also carries a hydraulic unit 234 as well as an additional gear 235. The gear 235 is in mesh with a gear 236 which is mounted on a hollow shaft 237.

The intermediate shaft 230 carries a gear 240 which is in mesh with a gear 241 mounted on a second auxiliary shaft 242. The shaft 242 is in driving relation with a hydraulic unit 243. The hydraulic units 243 and 234 are connected together hydraulically by suitable hydraulic lines 244, both units 234 and 243 may be variable in stroke.

In the transmission 220 there is also a second planetary assembly 245 having a carrier 246 which supports a set of planet gears 247. The planet gears 247 are in mesh with a sun gear 248 and with a ring gear 249. The ring gear 249 is connectable by a releasable brake 250 to a stationary housing 251, so that the ring gear 249 is held in a stationary position when the brake 250 is engaged.

The carrier 246 is provided with extensions 252 and 253, one on each side, and the sun gear 248 is provided with extensions 254 and 255, one on each side. The extension 254 of the sun gear 248 may be connected by means of a releasable clutch 256 to the hollow shaft 237, while the extension 255 may be connected by means of a releasable clutch 257 to the intermediate shaft 230. Similarly, the extension 252 of the carrier 246 may be connected by a releasable clutch 258 to the hollow shaft 237, and the extension 253 of the ring gear 246 may be connected to the intermediate shaft 230 by a releasable clutch 259. The extension 253 is joined directly to the final output shaft 260 by a radially extending member 261.

In effect, the two highest ranges of the transmission 220 are identical in operation to the basic two-range, two-clutch transmission 10, while two additional ranges have been added by use of the planetary reduction assembly 245 for use on lower speeds.

Thus, on the lowest speed range forward, Range I, the brake 250 is engaged to hold the ring gear 249 stationary, and the clutch 256 is engaged to cause the sun gear 248 to rotate with the hollow shaft 237. In Range I the power is transmitted from the input shaft 221 through the planet carrier 222 and the planet gears 224 to the sun gear 226 and from there via the shaft 228, gears 231 and 232, the shaft 233, and the gears 235 and 236 to the hollow shaft 237, and from there to the sun gear 248 and through the planetary reduction assembly 245 to the carrier 246, the member 261 and thereupon to the final output shaft 260.

In the usual manner, the hydraulic units, 234 and 243, are operated to increase the speed within Range I, and at a suitable shift speed, when the hollow shaft 237 is rotating at the same speed as the intermediate shaft 230, a synchronous shift is made by engaging the clutch 257 and shortly thereafter disengaging the clutch 256; the transmission 220 is then in Range II. The brake 250 continues to be engaged in this Range II. In Range II the power is transmitted from the input shaft 221 through the planet carrier 222 and the planet gears 224 to the ring gear 227 and therefrom to the shaft 230. The intermediate shaft 230 then transmits its power through the clutch 257 to the sun gear 248 to the planetary assembly 245, and this reduction planetary assembly again transmits power to the final output shaft 260 via the member 261.

Again, the hydraulic units are operated in the normal way to increase speed within Range II and a new synchronous shift point is reached; the shaft 237, the member 252, and the output shaft 260 are at an identical speed; so the clutch 258 can be engaged and shortly thereafter the clutch 257 is disengaged, as is the brake 250, so that the planetary assembly 248 plays no part in Ranges III and IV. From the time that this shift has been completed the reduction planetary assembly 245 will not be used on higher speeds. The power for Range III comes from the input shaft 221 and carrier 222 through the planet gears 224 to the sun gear 226 and thence via the shaft 228, gears 231 and 232, shaft 233, and gears 235 and 236 to the hollow shaft 237 and thence directly to the ouput shaft 260 via the carrier 246 and its extensions 252 and 253 and the radial member 261.

The final shift into Range IV is made in the same general manner, after the hydraulic units have increased the speed within Range III. At this next synchronous shift point the clutch 259 is engaged, and the clutch 258 is disengaged. The power then comes from the input shaft 221 via the main planetary assembly 223 to the ring gear 227 and the shaft 230 and thence directly to the output shaft 260 through the clutch 259.

The operation in reverse is accomplished by opposite rotations of the members in the lower Ranges, using the reduction planetary assembly 245 as before.

The speed lines diagram, FIG. 13, shows the operations already described, and the various lines are indicated by the reference numerals applied to them in FIG. 12.

Summary and Conclusion

In all forms of the planetary transmission of the present invention, the planetary assembly has only three members—in the sense that there are only three members which are rotating about the main common axis. It is not so important what these three members are, for they may be as shown in FIGS. 1–8, a sun gear, a carrier with its planet gears, and a ring gear, or they may be a carrier having intermeshed sets of planet gears both connected to separate ring gears as in FIG. 9, or they could be a carrier with intermeshed sets of planet gears connected to separate sun gears as in FIG. 11. Nor is it important so far as the invention is concerned which member of the planetary assembly serves as the input and which ones serve as output-reaction gears. The fact is that there are two member of the three-member planetary assembly which alternate as output and reaction, and when one of these two members is an output the other one is a reaction, vice versa. The input member, however, remains as input member. In the invention the shift made between the planetary members and the final output, by which the member formerly serving as an output member becomes a reaction member and a member formerly serving as a reaction member becomes an output member, is achieved synchronously. Each of the two members which act alternately as output or reaction is connected to a separate hydraulic unit while the two hydraulic units are hydraulically interconnected. At least one of these units must be variable in stroke and both may be. Of course, instead of hydraulic units, other forms of speed-varying means may be used as has been referred to already. Finally, there is no time during hydromechanical operation when the hydraulic unit is connected to the input member of the planetary assembly (In the FIG. 6 form of the invention the input shaft 11 is connectable to the hydraulic unit 20 in a hydrostatic mode used for starting and reverse operation only).

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A power transmission including in combination:
   input means,
   output means,
   a planetary gear assembly having only three members which rotate about a common centerline, one said member being a carrier-planet assembly, said three members consisting of an input member connected to said input means and first and second other members which alternate in function so that at some times said first other member serves as an output member and said second other member serves as a reaction member, while at other times said first other member serves as a reaction member and said second other member serves as an output member,
   speed-varying means, having a first member mounted on a firsts rotary shaft in driving relation therewith and a second member mounted on a second rotary shaft in driving relation therewith, said first and second members of said speed-varying means being connected together in driving relation by power transmitting means such that power put into one said member drives the other said member, and vice versa, at variable speeds,
   first means at all times connecting said first other member to said first rotary shaft,
   second means at all times connecting said second other member to said second rotary shaft,
   first clutch means for connecting said first other member in driving relation to said output means, and
   second clutch means for connecting said second other member in driving relation to said output means.

2. The power transmission of claim 1 wherein said input means, said output means, and said planetary assembly, are all coaxial.

3. The power transmission of claim 1 wherein said speed-varying means comprises as said first and second members a pair of variable-stroke hydraulic units and said power transmitting means comprises means for hydraulically connecting said units together so that one serves as a pump while the other serves as a motor and vice versa.

4. The power transmission of claim 1 wherein said first and second other members rotate about said common centerline in opposite directions with respect to said input member.

5. A power transmission including in combination:
   input means,
   output means,
   a simple planetary gear assembly having a carrier connected to said input means and carrying only one set of planet gears, a ring gear meshed with said set of planet gears, and a sun gear meshed with said set of planet gears, and no other members,
   speed-varying means, having a first member mounted on a first rotary shaft in driving relation therewith and a second member mounted on a second rotary shaft in driving relation therewith, said first and second members being connected together in driving relation by power transmitting means such that power put into one said member drives the other said member, and vice versa, at variable speeds,
   first gear train means at all times connecting said ring gear to said first rotary shaft,
   second gear train means at all times connecting said sun gear to said second rotary shaft,
   first clutch means for connecting said ring gear in driving relation to said output means, and
   second clutch means for connecting said sun gear in driving relation to said output means.

6. The power transmission of claim 5 wherein said input means, said output means, and said planetary assembly, are all coaxial.

7. The power transmission of claim 5 wherein said speed-varying means comprises as said first and second members a pair of variable-stroke hydraulic units and said power transmitting means comprises means for hydraulically connecting said units together so that one serves as a pump while the other serves as a motor and vice versa.

8. The power transmission of claim 5 wherein said ring gear and said sun gear rotate about said common centerline in opposite directions with respect to said carrier.

9. A power transmission including in combination:
input means,
output means,
a sunless planetary gear assembly having a carrier connected to said input means and carrying two sets of planet gears, a first ring gear meshed with one said set of planet gears, and a second ring gear meshed with the other said set of planet gears,
speed-varying means, having a first member mounted on a first rotary shaft in driving relation therewith and a second member mounted on a second rotary shaft in driving relation therewith, said first and second members being connected together in driving relation by power transmitting means such that power put into one said member drives the other said member, and vice versa, at variable speeds,
first gear train means at all times connecting said first ring gear to said first rotary shaft,
second gear train means at all times connecting said second ring gear to said second rotary shaft,
first clutch means for connecting said first ring gear in driving relation to said output means, and
second clutch means for connecting said second ring gear in driving relation to said output means.

10. The power transmission of claim 9 wherein said input means, said output means, and said planetary assembly, are all coaxial.

11. The power transmission of claim 9 wherein said speed-varying means comprises as said first and second members a pair of variable-stroke hydraulic units and said power transmitting means comprises means for hydraulically connecting said units together so that one serves as a pump while the other serves as a motor and vice versa.

12. A power transmission including in combination:
input means,
output means,
a planetary gear assembly having only three members which rotate about a common centerline, one said member being a carrier-planet assembly, said three members consisting of an input member connected to said input means and first and second other members which alternate in function so that at some times said first other member serves as an output member and said second other member serves as, a reaction member, while at other times said first other member serves as a reaction member and said second other member serves as an output member,
a first variable-stroke hydraulic unit having a first rotary shaft in driving relation therewith,
a second variable-stroke hydraulic unit having a second rotary shaft in driving relation therewith,
said hydraulic units being hydraulically connected together so that one serves as a pump while the other serves as a motor and vice versa,
first gear train means connecting said first other member at all times to said first rotary shaft,
second gear train means connecting said second other member at all times to said second rotary shaft,
first clutch means for connecting said first rotary shaft in driving relation to said output means, and
second clutch means for connecting said second rotary shaft in driving relation to said output means.

13. The power transmission of claim 12 wherein said first gear train includes a first auxiliary shaft secured to said first other member and having thereon a gear meshed with a gear secured to said first rotary shaft, said first clutch means clutching said first auxiliary shaft to said output means.

14. The power transmission of claim 13 having a second auxiliary shaft connected to said second rotary shaft by a gear train comprising a gear secured to said second auxiliary shaft and a gear secured to said second rotary shaft, and said second clutch means clutches said second auxiliary shaft in driving relation to said output means.

15. The power transmission of claim 14 wherein said input means, said output means, said planetary assembly, and said first and second auxiliary shafts are all coaxial.

16. The power transmission of claim 14 wherein said second gear train includes a third auxiliary shaft secured to said second other member and having thereon a gear meshed with an additional gear on said second rotary shaft.

17. The power transmission of claim 16 wherein said input means, said output means, said planetary assembly, and said first, second, and third auxiliary shafts are all coaxial.

18. The power transmission of claim 12 wherein there are first and second intermediate shafts, one coaxial with each of said first and second rotary shafts, each said intermediate shaft having thereon a drive gear,
said output means having an output gear secured thereto and meshed with both said drive gears,
said first clutch means clutching said first intermediate shaft to said first rotary shaft,
said second clutch means clutching said second intermediate shaft to said second rotary shaft.

19. The power transmission of claim 18 wherein
said first gear train comprises a gear secured to said first other member for rotation therewith about a common axis, a gear secured to said first rotary shaft, and a first idler gear between those said gears and in mesh therewith,
said second gear train comprising a gear secured to said second other member for rotation therewith about a common axis, a gear secured to said second rotary shaft, and a second idler gear between those said gears and in mesh therewith.

20. A power transmission including in combination:
input means,
output means,
a planetary gear assembly having a carrier connected to said input means and carrying a single set of planet gears, one only ring gear meshed with said set of planet gears, and one only sun gear meshed with said set of planet gears,
a first variable-stroke hydraulic unit having a first rotary shaft in driving relation therwith,
a second variable-stroke hydraulic unit having a second rotary shaft in driving relation therewith, said hydraulic units being hydraulically connected together so that one serves as a pump while the other serves as a motor and vice versa, first gear train means connecting said ring gear at all times to said first rotary shaft, second gear train means connecting said sun gear at all times to said second rotary shaft, first clutch means for connecting said first rotary shaft in driving relation to said output means, and second clutch means for connecting said second rotary shaft in driving relation to said output means.

21. A power transmission including in combination:
input means,
output means,
a sunless planetary gear assembly having a carrier connected to said input means and carrying two sets of planet gears, a first ring gear meshed with one said set of planet gears, and a second ring gear meshed with the other said set of planet gears,
a first variable-stroke hydraulic unit having a first rotary shaft in driving relation therewith,
a second variable-stroke hydraulic unit having a second rotary shaft in driving relation therewith,
said hydraulic units being hydraulically connected together so that one serves as a pump while the other serves as a motor and vice versa,
first gear train means connecting said first ring gear at all times to said first rotary shaft,
second gear train means connecting said second ring gear at all times to said second rotary shaft,
first clutch means for connecting said first rotary shaft in driving relation to said output means, and
second clutch means for connecting said second rotary shaft in driving relation to said output means.

22. A power transmission including in combination:
an input shaft,
an output shaft coaxial with and spaced from said input shaft,
a three-element planetary gear assembly coaxial with said input and output shafts and having a first element a carrier connected to said input shaft and having a set of planet gears, as a second element a ring gear in mesh with said planet gears, and as a third element a sun gear in mesh with said planet gears,
a first variable-stroke hydraulic unit having a first auxiliary shaft in driving relation therewith having secured thereto first and second pinion gears,
a second variable-stroke hydraulic unit having a second auxiliary shaft in driving relation therewith having secured thereto a third pinion gear,
said hydraulic units being hydraulically connected together so that when one acts as a pump the other acts as a motor and vice versa,
a third auxiliary shaft secured to said sun gear and having secured thereto a fourth pinion gear meshed with said first pinion gear, so that said sun gear is in driving relation with said first hydraulic unit,
a first transmission shaft in between said input and output shafts and coaxial therewith and secured to said ring gear and having secured thereto a fifth pinion gear meshed with said third pinion gear, so that said ring gear is in driving relation with said second hydraulic unit,
a hollow second transmission shaft surrounding said first transmission shaft and coaxial therewith and having secured thereto a sixth pinion gear meshed with said second pinion gear,
first clutch means for clutching said output shaft to said first transmission shaft, and
second clutch means for clutching said output shaft to said second transmission shaft.

23. A power transmission, including in combination:
an input shaft,
an output shaft offset from said input shaft and having an output gear secured thereto,
a three-element planetary gear assembly having as a first element a carrier connected to said input shaft and having a set of planet gears, as a second element a ring gear meshed with said planet gears, and as a third element a sun gear meshed with said planet gears,
a first variable-stroke hydraulic unit having a first auxiliary shaft in driving relation therewith with a first pinion gear secured thereto,
a second variable-stroke hydraulic unit having a second auxiliary shaft in driving relation therewith and having a second pinion gear secured thereto,
said hydraulic units being hydraulically connected together so that when one serves as a pump the other serves as a motor and vice versa,
a third pinion gear secured to said ring gear for coaxial rotation therewith,
a first idler gear meshed with both said first and third pinion gears,
a fourth pinion gear secured to said sun gear for coaxial rotation therewith,
a second idler gear meshed with both said second and fourth pinion gears,
a first hollow shaft surrounding and coaxial with said first auxiliary shaft and having secured thereto a fifth pinion gear meshed with said output gear,
first clutch means for releasably clutching said first hollow shaft to said first auxiliary shaft,
a second hollow shaft surrounding and coaxial with said second auxiliary shaft and having secured thereto a sixth pinion gear meshed with said output gear, and
second clutch means for releasably clutching said second hollow shaft to said second auxiliary shaft.

24. A power transmission including in combination:
input means,
output means,
a three-member planetary gear assembly having a first member connected to said input means and serving at all times as an input member, and second and third members each in driving relation to said first member and serving alternately as output and as reaction, so that when said second member serves as an output member, said third member serves as a reaction member and vice versa,
there being first clutch means for connecting said second member in driving relation to said output means, and second clutch means for connecting said third member in driving relation to said output means, and
speed-varying means, having a first member mounted on a first rotary shaft in driving relation therewith and a second member mounted on a second rotary shaft in driving relation therewith, said first and second members of said speed-varying means being connected together in driving relation by power transmitting means such that power put into one said member drives the other said member, and vice versa, at variable speeds, said second planetary member being operatively connected at all times to said first rotary shaft, and said third planetary member being operatively connected at all times to said second rotary shaft.

25. The power transmission of claim 24 wherein said input means, said output means, and said planetary assembly, are all coaxial.

26. The power transmission of claim 24 wherein said speed-varying means comprises as its said first and second members a pair of hydraulic units, at least one of which is variable in stroke, and said power transmitting means comprises means for hydraulically connecting said units together so that one serves as a pump while the other serves as a motor and vice versa.

27. A power transmission including in combination:
input means,
output means,
a planetary gear assembly having only three members which rotate about a common centerline, one said member being a carrier-planet assembly, said three members consisting of an input member connected to said input means and first and second other members which alternate in function so that at some times said first other member serves as an output member and said second other member serves as a reaction member, while at other times said first other member serves as a reaction member and said second other member serves as an output member,
speed-varying means, having a first member mounted on a first rotary shaft in driving relation therewith and a second member mounted on a second rotary shaft in driving relation therewith, said first and second members of said speed-varying means being connected together in driving relation by power transmitting means such that power put into one said member drives the other said member, and vice versa, at variable speeds,
first means connecting said first other member at all times to said first rotary shaft,
second means connecting said second other member at all times to said second rotary shaft,
first clutch means for connecting said first other member in driving relation to said output means,
second clutch means for connecting said second other member in driving relation to said output means,
reduction gear means having an input member and an output member connected to said output means,
third clutch means for connecting said first other member in driving relation to said input member of said reduction gear means, and
fourth clutch means for connecting said second other member in driving rotation to said input member of said reduction gear means.

28. The power transmission of claim 27 wherein said input means, said output means, said planetary assembly, and said reduction gear means are all coaxial.

29. The power transmission of claim 28 wherein said speed-varying means comprises as said first and second members a pair of variable-stroke hydraulic units and said power transmitting means comprises means for hydraulically connecting said units together so that one serves as a pump while the other serves as a motor and vice versa.

30. A power transmission including in combination:
input means,
output means,
a three-element first planetary gear assembly having as a first element a carrier connected to said input means and carrying a set of planet gears, as a second element a ring gear meshed with said set of planet gears, and as the third element a sun gear meshed with said set of planet gears,
speed-varying means, having a first member mounted on a first rotary shaft in driving relation therewith and a second member mounted on a second rotary shaft in driving relation therewith, said first and second members being connected together in driving relation by power transmitting means such that power put into one said member drives the other said member, and vice versa, at variable speeds,
first gear train means connecting said ring gear at all times to said first rotary shaft,
second gear train means connecting said sun gear at all times to said second rotary shaft,
first clutch means for connecting said ring gear in driving relation to said output means,
second clutch means for connecting said sun gear in driving relation to said output means,
a second, reduction, planetary assembly having a carrier secured to said output shaft, planet gears carried by said carrier, a sun gear in mesh with said planet gears, and a ring gear also in mesh with said planet gears,
third clutch means for connecting said ring gear of said first planetary assembly to said sun gear of said second planetary assembly,
fourth clutch means for connecting said sun gear of said first planetary assembly to said sun gear of said second planetary assembly, and
releasably brake means for holding stationary said ring gear of said second planetary assembly.

31. The power transmission of claim 14 wherein said second gear train includes a third auxiliary shaft secured to said second other member and having thereon a gear meshed with a first additional gear mounted on said second rotary shaft and clutch means for clutching said first additional gear to said second rotary shaft and for disengaging it therefrom.

32. The power transmission of claim 31 having:
a second additional shaft secured to said input means,
a third additional gear mounted rotatably on said second rotary shaft,
clutch means for clutching said third additional gear to said second rotary shaft and for disengaging it therefrom.

33. The power transmission of claim 32 having:
a fourth additional gear secured to said first rotary shaft,
a fourth auxiliary shaft having thereon a fifth additional gear meshed with said fourth additional gear, and
clutch means for clutching said fourth auxiliary shaft to said output means.

34. The power transmission of claim 35 wherein said first, second, third, and fourth auxiliary shafts, said input means, said output means, and said planetary assembly are all coaxial.

35. A power transmission including in combination:
an input shaft having a first pinion gear secured thereto,
an output shaft coaxial with and spaced from said input shaft, a three-element planetary gear assembly coaxial with said input and output shafts and having as a first element a carrier connected to said input shaft and having a set of planet gears, as a second element a ring gear in mesh with said planet gears, and as a third element a sun gear in mesh with said planet gears, a first variable-stroke hydraulic unit having a first auxiliary shaft in driving relation therewith having secured thereto a second pinion gear and having rotatable thereon and clutchable thereto third and fourth pinion gears, said third pinion gear being in mesh with said first pinion gear, a second variable-stroke hydraulic unit having a second auxiliary shaft in driving relation therewith having secured thereto a fifth and sixth pinion gears, said hydraulic units being hydraulically connected together so that when one acts as a pump the other acts as a motor and vice versa, a third auxiliary shaft secured to said sun gear and having secured thereto a seventh pinion gear meshed with said fourth pinion gear, a first transmission shaft in between said input and output shafts and coaxial therewith and secured to said ring gear and having secured thereto an eighth pinion gear meshed with said fifth pinion gear, so that said ring gear is in driving relation with said second hydraulic unit, a hollow second transmission shaft surrounding said first transmission shaft and coaxial therewith and having secured thereto a ninth pinion gear meshed with said second pinion gear, a hollow third transmission shaft surrounding said second transmission shaft and coaxial therewith and having secured thereto a tenth pinion gear meshed with said sixth pinion gear, first clutch means for clutching said output shaft to said first transmission shaft, second clutch means for clutching said output shaft to said second transmission shaft, third clutch means for clutching said output shaft to said third transmission means, fourth clutch means for clutching said first auxiliary shaft to said third pinion gear so that said input shaft is in driving relation with said first hydraulic unit, and fifth clutch means for clutching said first auxiliary shaft to said fourth pinion gear so that said sun gear is in driving relation with said first hydraulic unit.

* * * * *

UNITED STATES PATENT AND TRADEMARK OFFICE
CERTIFICATE OF CORRECTION

PATENT NO. : 3,988,949
DATED : November 2, 1976
INVENTOR(S) : William E. Weseloh and Elias Orshansky, Jr.

It is certified that error appears in the above-identified patent and that said Letters Patent are hereby corrected as shown below:

```
Column 2, line 9, "hydaulic" should read --hydraulic--.
Column 2, line 26, "be separate" should read --by separate--.
Column 6, line 39, "is ia" should read --is a--.
Column 8, line 66, "transmission" should read --transmissions--.
Column 11, line 28, "two member" should read --two members--.
Column 11, line 31, before "vice versa" insert --and--.
Column 12, line 7, "firsts" should read --first--.
Column 13, line 56, "serves as, a" should read --serves as a--.
Column 15, line 40, "having a first " should read --having as
                                                   a first--.
Column 18, line 34, "releasably" should read --releasable--.
Column 18, line 60, which is line 1 of claim 34, "claim 35"
should read --claim 33--.
```

Signed and Sealed this

Seventeenth Day of May 1977

[SEAL]

Attest:

RUTH C. MASON
Attesting Officer

C. MARSHALL DANN
Commissioner of Patents and Trademarks